US008881445B2

(12) United States Patent
Nolf

(10) Patent No.: US 8,881,445 B2
(45) Date of Patent: Nov. 11, 2014

(54) TIP UP FISHING DEVICE

(76) Inventor: Linda K. Nolf, Cadillac, MI (US)

( * ) Notice: Subject to any disclaimer, the term of this patent is extended or adjusted under 35 U.S.C. 154(b) by 467 days.

(21) Appl. No.: 13/205,083

(22) Filed: Aug. 8, 2011

(65) Prior Publication Data

US 2012/0291332 A1 Nov. 22, 2012

Related U.S. Application Data

(60) Provisional application No. 61/488,316, filed on May 20, 2011.

(51) Int. Cl.
*A01K 97/12* (2006.01)

(52) U.S. Cl.
USPC ............................................................ 43/17

(58) Field of Classification Search
CPC ...... A01K 97/12; A01K 97/125; A01K 97/01
USPC ............................................................ 43/17
See application file for complete search history.

(56) References Cited

U.S. PATENT DOCUMENTS

| | | | | |
|---|---|---|---|---|
| 1,021,147 A * | 3/1912 | Green | | 43/17 |
| 1,451,124 A * | 4/1923 | Stolze | | 43/17 |
| 2,137,771 A * | 11/1938 | Goodwin | | 43/16 |
| 2,530,864 A * | 11/1950 | Easterday | | 43/17 |
| 2,554,927 A * | 5/1951 | Schultz, Jr. | | 43/16 |
| 2,714,270 A * | 8/1955 | Premo | | 43/17 |
| 3,187,456 A * | 6/1965 | Apitz | | 43/17 |
| 3,824,730 A * | 7/1974 | Johnson | | 43/17 |
| 4,030,223 A | 6/1977 | Loesch et al. | | |
| 4,270,297 A | 6/1981 | Yates | | |
| 4,373,287 A * | 2/1983 | Grahl | | 43/17 |
| 4,662,099 A * | 5/1987 | Stewart | | 43/17 |
| 4,837,965 A * | 6/1989 | True | | 43/17 |
| 4,949,497 A * | 8/1990 | Lindell | | 43/17 |
| 5,005,310 A | 4/1991 | Rinehart | | |
| 5,050,333 A * | 9/1991 | Debreczeni | | 43/17 |
| 5,228,227 A * | 7/1993 | Hodgson, Sr. | | 43/15 |
| 5,987,801 A * | 11/1999 | Anderson | | 43/17 |
| 6,079,142 A * | 6/2000 | Danser et al. | | 43/17 |
| 6,170,189 B1 * | 1/2001 | Klein | | 43/17 |
| 6,594,941 B1 * | 7/2003 | Anderson | | 43/17 |
| 6,622,421 B1 * | 9/2003 | Daniels | | 43/21.2 |
| 7,008,086 B1 | 3/2006 | Kell | | |

(Continued)

FOREIGN PATENT DOCUMENTS

| | | | | |
|---|---|---|---|---|
| CA | 2077694 A1 * | 3/1994 | | A01K 97/01 |
| WO | WO 9206593 A1 * | 4/1992 | | A01K 97/01 |
| WO | WO 0074480 A2 * | 12/2000 | | A01K 97/12 |

*Primary Examiner* — Darren W Ark
(74) *Attorney, Agent, or Firm* — Douglas S. Bishop

(57) ABSTRACT

A tip up fishing device with a substantially vertical arm and a substantially horizontal cross arm, a holding pin at its end which pivots from a substantially horizontal position, downwardly, to a substantially vertical position. The pin holds a spool of fishing line, rotatably mounted. A strike of a fish moves the pin from horizontal position to vertical position, moving the spool of line from a substantially vertical inclination of the spool face, with the line under pressure, to a substantially horizontal position of the spool face, allowing the line to pay out without significant resistance. The pivotal movement of the axis pin which holds the spool, from horizontal position to a downward vertical position, triggers both a flag and an electric light notification. The lower end of the upright portion of the rigid support is adaptable to attach to different bases as a means for support.

19 Claims, 6 Drawing Sheets

(56) References Cited

U.S. PATENT DOCUMENTS

| | | |
|---|---|---|
| 7,032,343 B1 | 4/2006 | Foss |
| 7,281,348 B2 | 10/2007 | Allen, Jr. et al. |
| 7,316,094 B1 * | 1/2008 | Bishop .............. 43/15 |
| 7,322,148 B2 * | 1/2008 | Coulman ............ 43/17 |
| 7,395,628 B2 * | 7/2008 | Rayfield ............ 43/17 |
| 7,946,076 B2 * | 5/2011 | Gascoigne .......... 43/16 |
| 8,276,310 B1 * | 10/2012 | Weber ............... 43/17 |
| 2002/0139033 A1 | 10/2002 | Scherg |
| 2003/0145508 A1 | 8/2003 | Pieczynski |
| 2006/0150469 A1 | 7/2006 | Allen, Jr. et al. |
| 2011/0107652 A1 * | 5/2011 | Getzinger .......... 43/17 |
| 2012/0151818 A1 * | 6/2012 | Orth ................. 43/16 |
| 2013/0227873 A1 * | 9/2013 | Coulson ............ 43/17 |

\* cited by examiner

TIP UP FISHING DEVICE

CROSS-REFERENCE TO RELATED APPLICATIONS

The present application claims the priority of U.S. Provisional Patent Application Ser. No. 61/488,316, filed May 20, 2011.

BACKGROUND OF THE INVENTION

The utilization of "tip up" device featuring a flag or other signal release activated by the strike of a fish on a bait or lure attached by a fishing line to the tip up device is known. U.S. Pat. No. 7,281,348, to Allen, Jr. et al, for an Ice Fishing Apparatus with Eccentric Release Feature, discloses a tip up device, with a vertically inclined spool, suspended below water level, which, when the spool is caused to rotate, releases a flag; U.S. Pat. No. 7,032,343, to Foss, for an Ice Fishing Tip Up Strike Indicator, discloses a submerged spool with a pendulum switch, which, when a fish strikes, causes a tip up arm to swing into vertical position, and a light is ignited; U.S. Pat. No. 7,008,086, to Kell, for an Electronically Controlled Flashing Light and RF transmitter for ice fishing tip ups, provides a fish striking indicator whereby a fish strike of sufficient pressure causes a mast to pop up, the mast incorporating a tilt sensitive switch which engages a power supply and selectively energizes a circuit including a flashing light and a remote transmitter; U.S. Pat. No. 6,079,142, to Danser et al, for an Ice Fishing System, provides a pivotally mounted fishing pole, coupled to the upper end of a post, wherein a strike causes the opposite end of the pole to rise; U.S. Pat. No. 5,005,310, to Rinehart, for a Floating Tip Up Fishing Rig provides a release for a flag mounted on spring tension, which rises vertically upon being released by pressure from a fish strike.

In the cited examples of prior art and others, when a fish strikes, the line has to turn off the spool, requiring greater pressure or, in some of the prior art, where the spool is in ultimate free flow of position, the line has to be manually placed through a "trigger," which is extremely sensitive. Further, a number of the prior art devices require the line spool, and/or trigger device, to be beneath the surface of the water, a significant problem in sub-zero/sub-freezing conditions when the spool of line and/or trigger nets are removed from the water. When a fish strikes, after the initial strike which should be sufficient to set the hook, in tip up devices, there is normally an expected delay in the fisherman reaching the tip up to take the line and retrieve the fish. It is extremely important to provide no drag back in the tip up until the operator can reach the site. Further, much of the prior art has spools permanently mounted, which require cutting or exchanging of line, as opposed to simply interchanging spools. Much of the prior art, in addition, provides only one strike notification, whereas the desirability of a visual flag, and/or an illuminated bulb, may vary, depending upon changing light wind and element conditions.

The present invention fills a need not met by the prior art, in providing a tip up device in which the strike of a fish not only releases a flag notification, and activates an electric circuit to provide an illuminating bulb, but also shifts the spool of fishing line from a vertical position to one which horizontally allows free flow of line until the fisherman can reach the device to retrieve the fish. The instant further; provides a feature not shown in the prior art, allowing the device to be supported, in actual fishing operation, not only by a provided support base but, additionally, by attachment to any suitable vertical surface, allowing the fisherman, if so desired, to mount the device on a sled, auger, or other improvised base, without requiring contact with the actual ice surface.

SUMMARY OF THE INVENTION

The tip up fishing device of the present invention is designed to meet the shortcomings of the prior art and improve upon it significantly. In its most elemental form, the invention consists of an upright substantially vertical support arm, with a substantially horizontal cross arm, extending outwardly from the top portion of the vertical support arm. At the end of the cross arm a spool supporting pin is pivotally mounted so that it moves between a first position which is approximately linear with the cross arm, to a downward position approximately parallel to the support arm. A spool of fishing line is mounted upon the pivotally mounted pin and held in place by a fastener, to the desired degree of pressure. In the preferred embodiment of the invention, the vertical support arm has, at its base, a metal, or otherwise resilient material "clip," which allows it to be fastened to either the latch mechanism of the base plate, or to any substantially vertical surface whose width permits.

A resistantly bendable trigger member is provided, which extends upward from the vertical base member and may be bent manually to a substantially horizontal position, to hold the spool is in its upper or first position. When a fish strikes a lure or bait attached to the fishing line, with the pressure of the strike, the spool moves from its upper to its downward position, allowing line to pay off freely thereafter and the resiliently bendable member returns to an upright vertical position. A flag is provided on the resiliently bendable member, so that return to upright vertical position may be visibly observed by the fisherman.

It is an additional feature of the device that, when a fish strikes, and the spool and supporting pin pivot from the initial position, to the lower position, a portion of the spool support structure completes an electric circuit, which illuminates an electric light bulb, for further visual notification purposes.

In the preferred embodiment of the invention, a carrying case, generally consisting of a two-piece rectangular box, is provided, which box divides into two separate sections upon opening. Each section of the carrying case has a hole approximately centered to allow the fishing line, from the suspended spool, to pay, therethrough, and the case generally covers the hole in the ice to provide a shading effect, to allow only a minimal amount of light to show through the hole in the ice, and into the water below.

A pair of the devices of the present invention may be carried together in the case box when separate sections thereof are combined, and each half, when separated, may be a separate base for each respective unit.

The above and additional features of the invention may be considered and will become apparent in conjunction with the drawings in particular, and the detailed description which follows.

BRIEF DESCRIPTION OF THE DRAWINGS

Reference will now be made to the attached drawings which are to be read in combination with the following description, wherein like reference numerals refer to like parts throughout the several views and in which.

DETAILED DESCRIPTION

Figure 1:
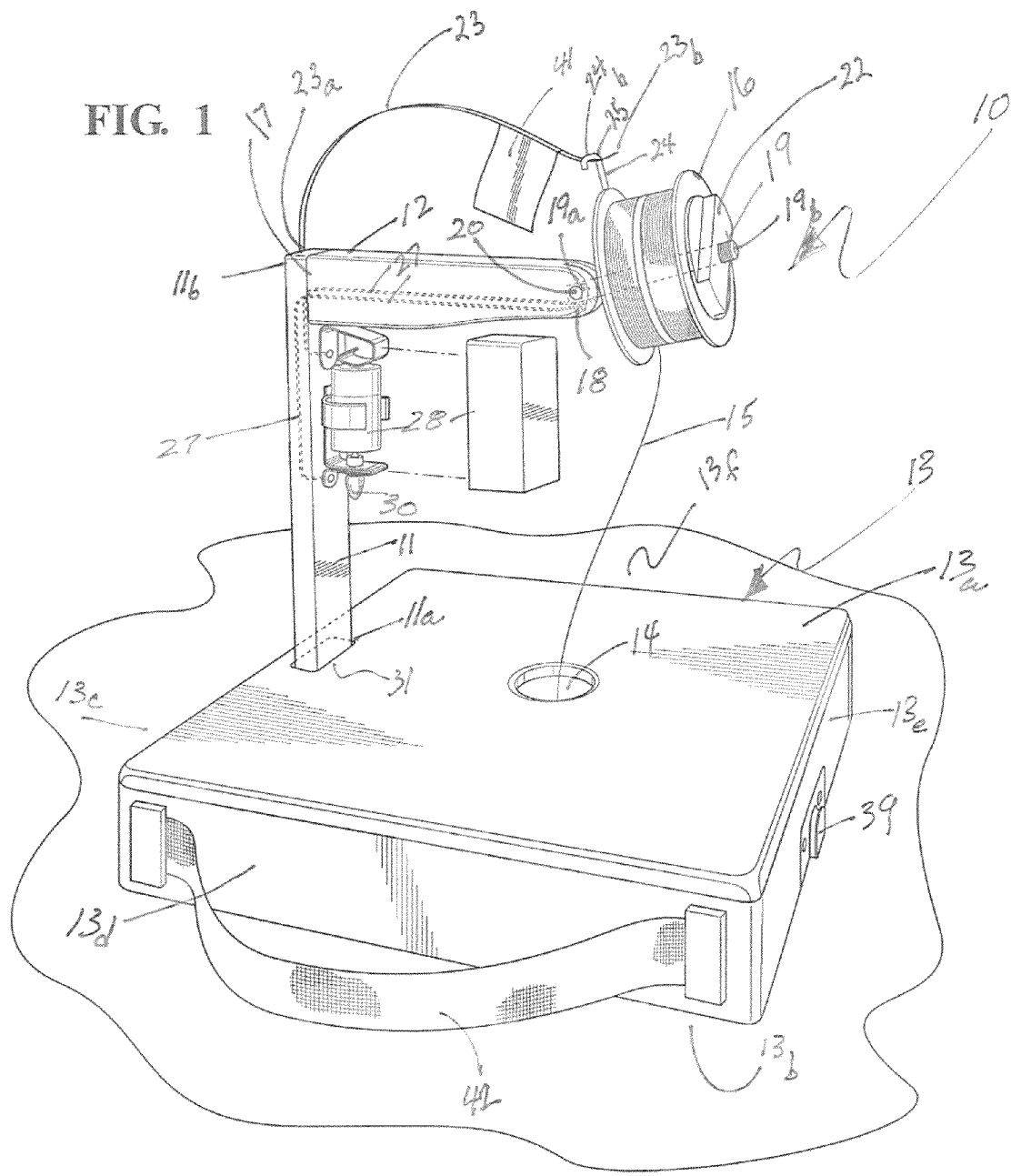
FIG. 1 is a perspective view of the tip up fishing device, showing the same, in set, fishing position, utilizing a portion of a caring case as a base, showing the set flag notification trigger, and circuitry and components of the illuminating bulb.

The invention tip of fishing device 10, broadly considered, has an upright, generally vertically inclined member (or arm) 11, with a lower end 11a and an upper, end 11b. A rigid support arm 12 extends outwardly from said vertical member 11.

Figure 2:
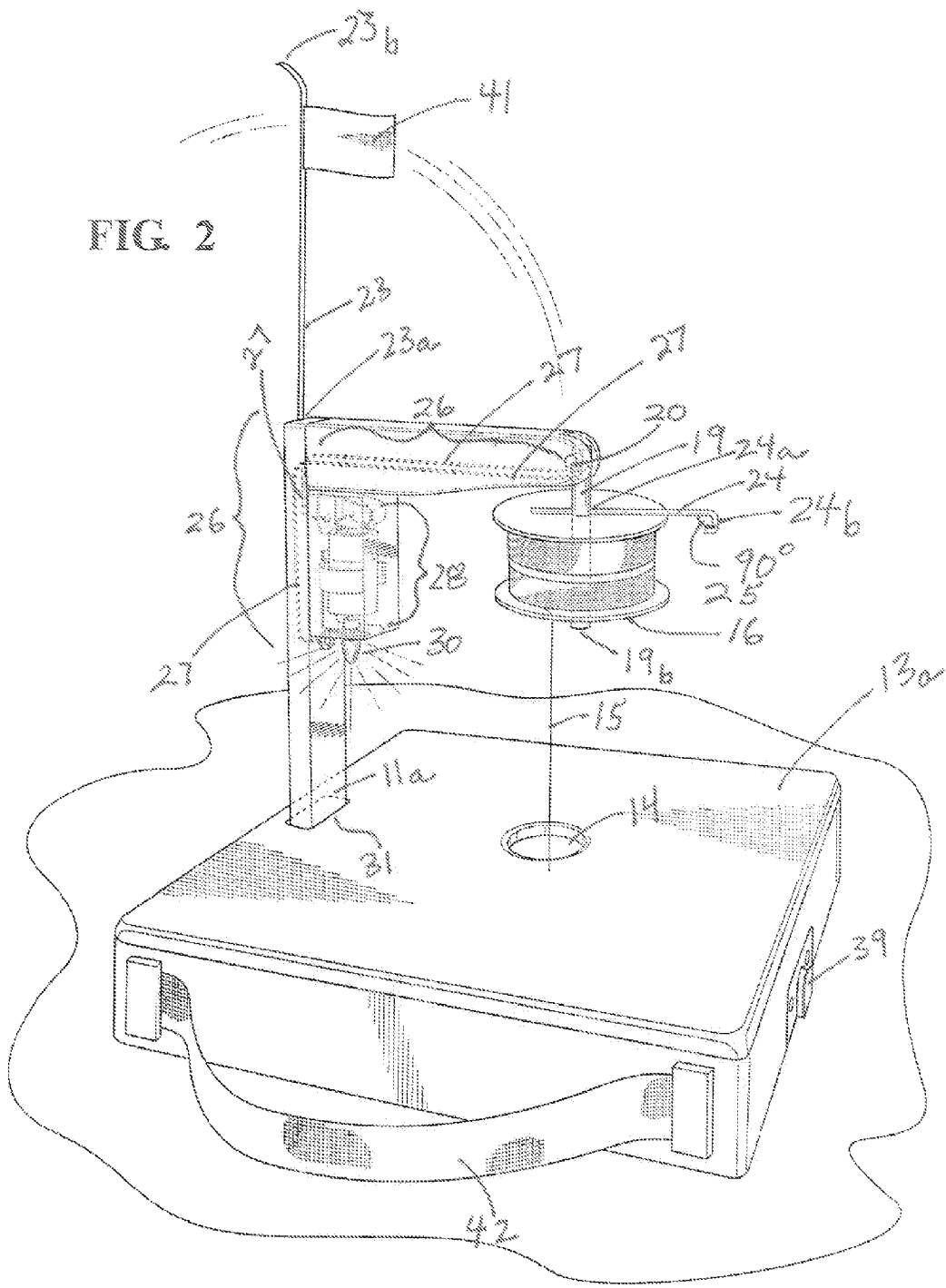
FIG. 2 is a perspective view of the invention, showing the position of the movable portion of the spool attachment after a fish has struck, the trigger flag in upright position, and the bulb illuminated.
Figure 3:
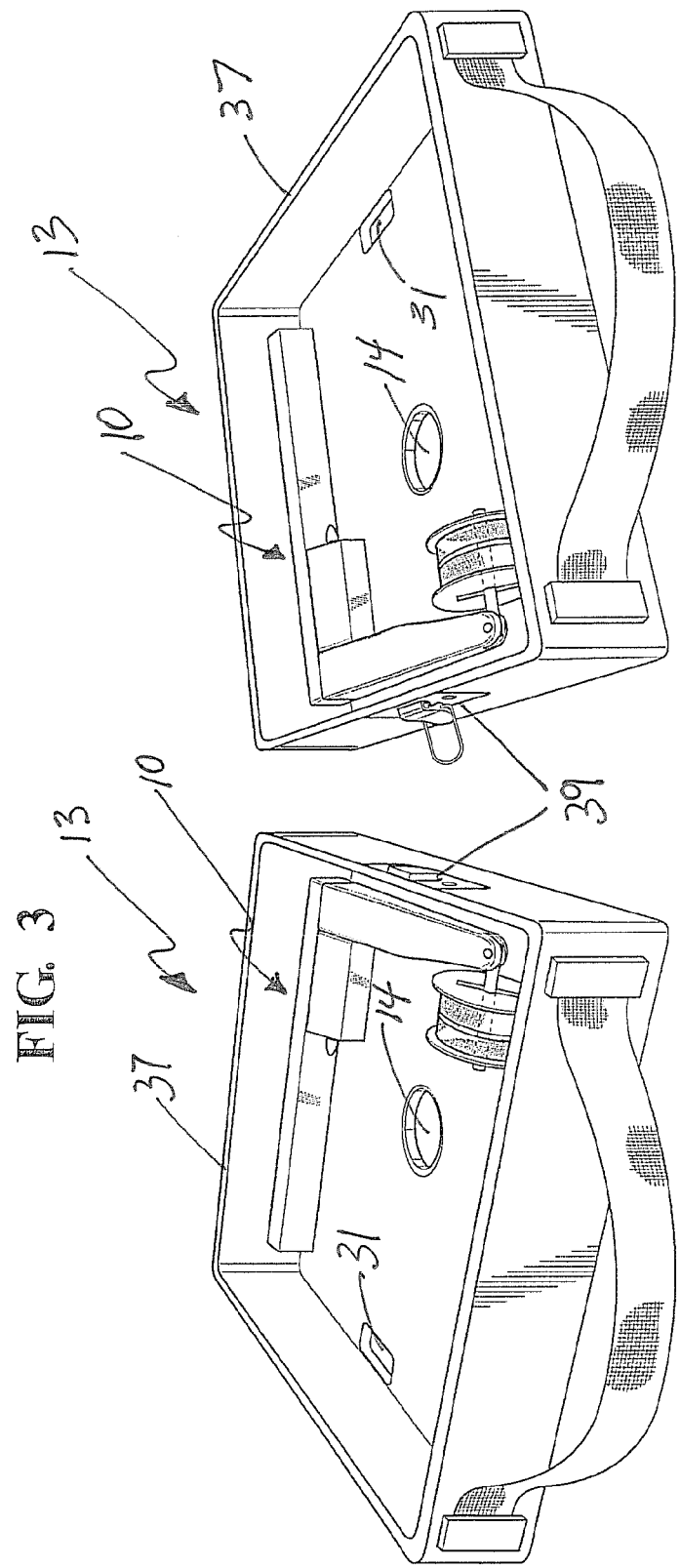
FIG. 3 is a perspective view of an open carrying case for the invention, showing two tip up devices, stored in the respective halves of the carrying case.

The vertical arm 11 is connected at its lower end 11a to base support 13. In the embodiment of the invention 10 shown in the drawings; base 13 is a box structure as shown in FIGS. 1, 2 and 3, such box structure having a bottom 13a, an open top side 13b, and four sides, 13c, 13d, 13e and 13f. The bottom 13a surface has an aperture 14. As can be seen in FIGS. 1 and 2, the aperture 14 is placed so as to allow a fishing line 15 extending from a spool 16 to extend downwardly through it in fishing operation. Subject to the requirement, that line 15 be allowed to pass through aperture 14 in a substantially downwardly vertical direction, the shape, size and location on the bottom 13a of base 13 of aperture 14 are not critical to the invention and may be defined as desired by bottom 13a without other limitations.

In practice, however, base member 13 may be any structure or support to which arm 11 may be attached at its lower end 11a which is sufficient to hold arm 11 substantially upright and allow line 15 to extend downward without contact or interference from the base 13. Utilizing a bucket, a sled, an auger or other type of equipment as a base 13 acceptable alternative to embodiment described.

The support arm 12 has an inward, first end 17 and an outward second end 18.

Figure 4:
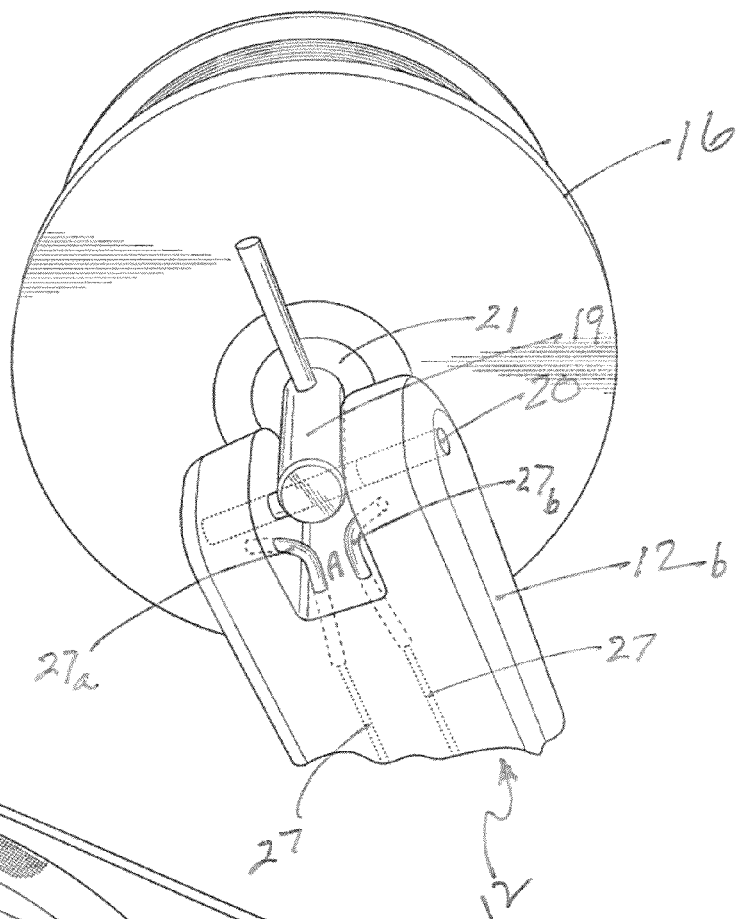
FIG. 4 is a bottom view of the vertical end of the cross portion of the invention, in set position, demonstrating the pivotal arm of the spool pin, and the elements by which the electric circuit is completed.
Figure 5:
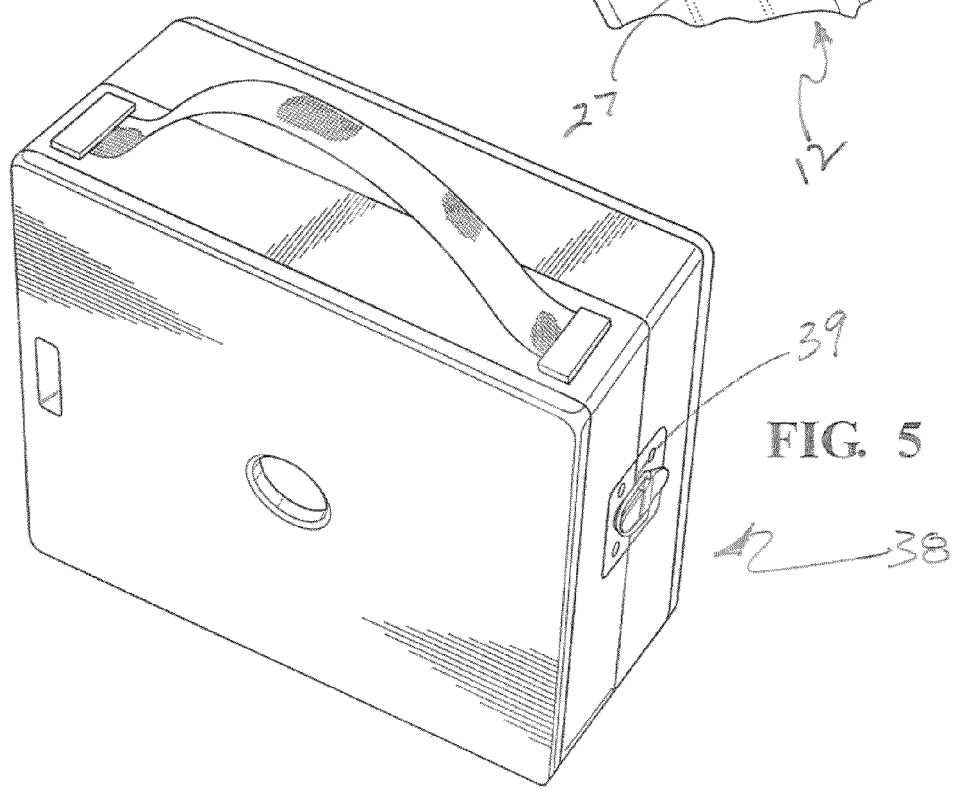
FIG. 5 is a perspective view of the invention carrying case, in closed position.

A cylindrical pin member 19, with an inward end 19a and an extended end 19b, is pivotally mounted at its inward end 19a to the outer, extended end 18. In the embodiment presented inward end 19a is affixed perpendicularly to a rotatable axis member 20 extending through the extended end 18 of arm 12. This relationship of arm 12, pin member 19 and axis member 20 is shown in FIG. 4.

The cylindrical pin member 19 pivots or moves on axis 20 between its first position, substantially horizontal and inline with arm 12, as shown in FIG. 1, to its second position as shown in FIG. 2, substantially downwardly vertical from axis 20, and substantially perpendicular to arm 12.

A spool 16 of fishing line 15 is rotatably mounted on pin member 19. Pin 19 serves as an axis for the rotation of spool 16. A washer 21 is placed on pin 19, adjacent the outward end 18 of arm 12. The spool is placed outwardly and adjacent washer 21 on pin 19. The extended end 19b of pin 19 is threaded and a correspondingly threaded nut member 22 is adjustably placed on pin 19 in respective female-male relationship.

Nut member 22 may be tightened by rotation on pin 19 or loosened by counter rotation to, respectively, increase or decrease resistance to rotation of spool 16 on pin 19. In its loosest position, nut member 22 allows rotation of spool 16 to accommodate normal pressures 6f a bait or current without changing the positions of spool 16 and pin 19. In such position, greater tension on line 15 is required to move spool 16 and pin 19. When nut member 22 is tightened to prevent rotation of spool 16, any actual downward movement of line 15 will move pin 19 and spool 16 downwardly toward the second position shown in FIG. 2.

It is an advantage of the invention that when the spool 16 and pin 19 are released to their second position with pin 19 in its downward substantially vertical position, line 15 plays freely off spool 16 giving the user time to arrive, and harvest the fish.

A trigger lever 23 is also provided. Lever 23 has a first end 23a attached to the device 10, substantially in parallel to vertical arm 11. In the embodiment shown, it is attached to arm 11, but it may also be attached extending upwardly and substantially vertically from support arm 12. Trigger lever 23 also has an extended second end 23b.

Figure 8:
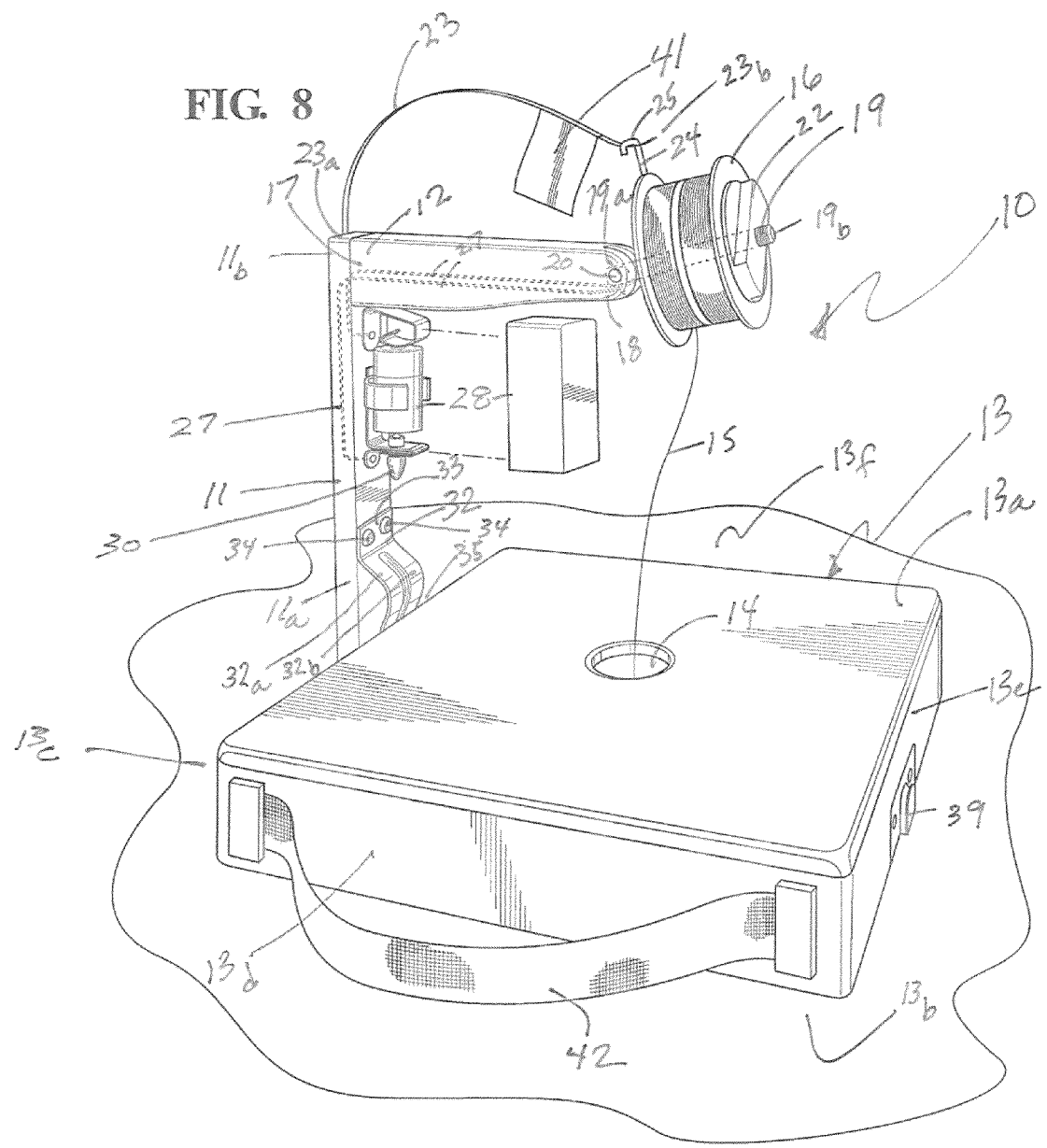
FIG. 8 is a perspective view of the invention, in set position, wherein the vertical arm of the invention is attached to the base at the side of the carrying case.

A rigid wire member 24 which serves as a trigger catch is attached at a first end 24a to pin 19 inward of spool 16, or it may be attached to spool 16. The second end 24b of wire 24 extends upwardly above spool 16 and is bent 25 near its second end 24b to at least 90°. When spool 16 and pin 19 are placed in their first position as shown in FIGS. 1 and 8, trigger catch 24 extends upwardly and lever member 23 is resistably bent so that its second end 23b is held under the bent second end 24b of trigger catch 24.

When downward rotation of pin 19 from force on line 15 moves trigger catch 24 outward and downward toward the position shown in FIG. 2, trigger lever 23 is released and returns to its upright position.

A flag or banner 41 is affixed to trigger lever 23 proximate its extended second end 23b. When lever 23 is returned to the vertical, banner 41 provides the user notice that a fish has struck.

The invention 10 also includes a second means of notifying the user when a fish has struck. An open electric circuit 26, consisting of wire 27 capable of conducting an electric signal, a light 30, and a power source, which in this instance is a battery 28. Two wire 27 ends 27a and 27b, separated by space A, are located adjacent the outward end 18 of support arm 12. When pin 19 moves from its first position as shown in FIG. 1, to its second position as shown in FIG. 2, pin 19 simultaneously contacts wire ends 27a and 27b, completing the electrical circuit and lighting the light 30 from electricity from the power source battery 28.

When invention 10 uses as its base 13, the box structure previously described and demonstrated in FIGS. 1, 2, 3 and 7, the means of affixing arm 11 to the base 13 may be an opening or aperture 31 formed in the box bottom 13a, conformed to accept, and hold upright, the lower end 11a vertical arm 11 in male-female relationship.

Figure 6:
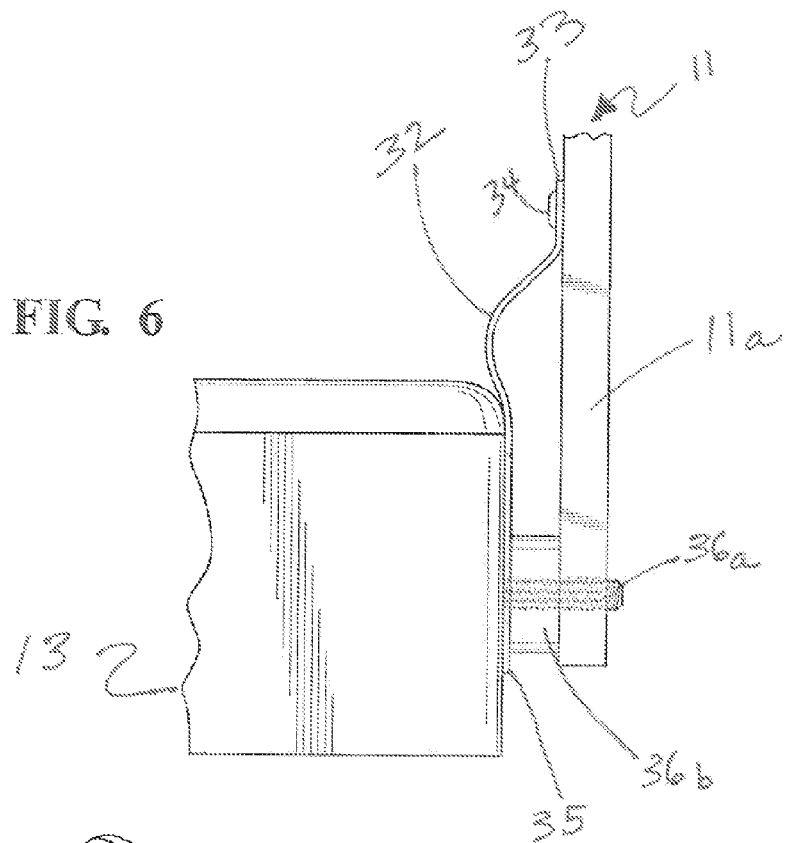
FIG. 6 is a side view of the vertical arm of the tip up device as affixed to the vertical side of the carrying case.

Alternatively, the lower end 11a may include an attached clip member 32, more fully shown in FIGS. 6 and 8, which clip member 32 is constructed of resilient material. Clip member 32 is attached to lower end 11a at its upper end 33 by one or more fasteners 34 which each may be a rivet, screw, nail or other fastening device, or which could be molded as part of arm 11. At its upper end clip 32 may be resiliently bent away from arm 11 to allow clip 32 to hold a part of any structure serving as base 13 between arm 11 and clip 32, under pressure. As shown in FIGS. 6 and 8, clip 32 is constructed to provide a pair of prongs 32a and 32b to fit over a protruding bolt 36a and nut 36b combination, with the nut held between prong 32a and 32b, and the arm 11, as shown in the FIG. 6 side view.

Figure 7:
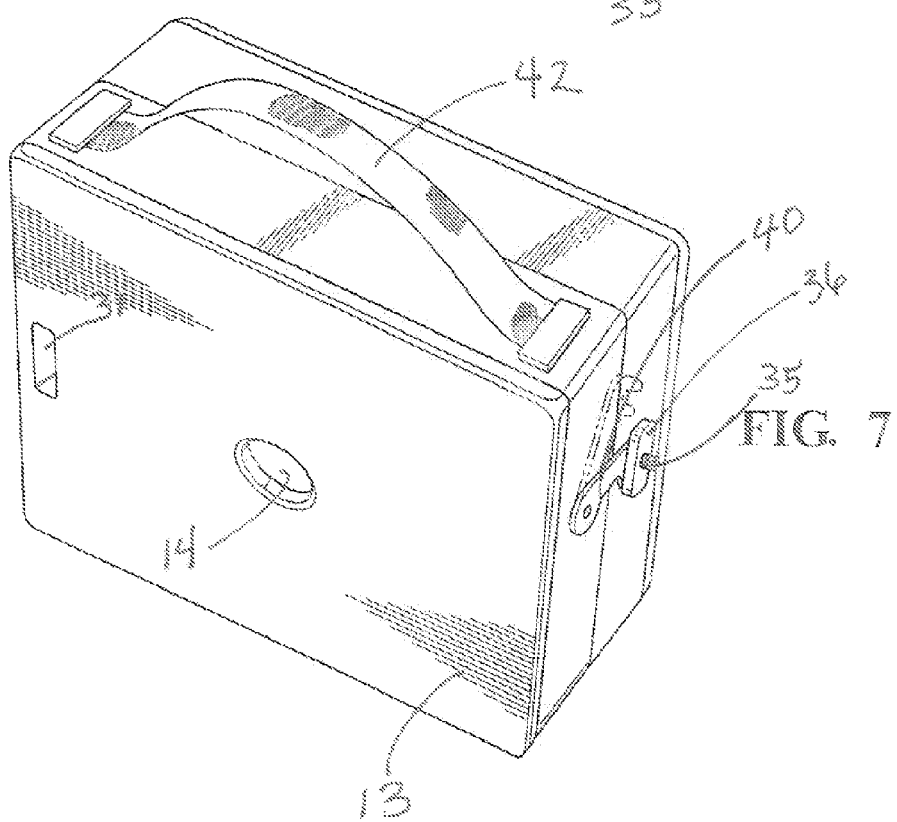
FIG. 7 shows the locking arm on the side of the carrying case, from open to closed position.

Finally, when the base 13 is the box member described above, and as shown FIG. 3, a pair of base 13 members with corresponding side edges 37 may be combined to form carrying case 38 as shown in FIG. 7. Two or, more devices 10 may be carried within the case as shown in FIG. 3, and the case may be held together in transit by a pair of fasteners 39, located on opposing sides of the case 38. When the means of supporting the vertical member 12 is the aperture 31, on each box member 13 of case 38 a simple clip fastener 39 as shown in FIG. 3 may be used. If the device 10 includes clip 32, the two base members 13 may be held together to form case 38 by a rotatable hook member 40 located on one side of the base box 1, moveable to engage a protruding bolt member 35 located on the corresponding side of the opposed base box member 13. When hook member 40 engages bolt 35, nut 36 may be tightened to hold hook member 40 in place. On the opposing ends of the corresponding base members 13, the hook 40 and bolt 35 may be juxtaposed so that, when separated, each of the two base members 13 has a protruding bolt 35 and nut 36 combination to provide for attachment of arm 11 by use of clip 32.

Finally, a handle or strap 42 is provided on each box member 13 for carrying purposes.

Having described my invention, other and additional preferred embodiments will become apparent to those skilled in the art to which it pertains, and without deviating from the scope of the appended claims.

I claim:

1. A tip up fishing device, comprising:
    a primary vertically inclined member having a lower end and an upper end;
    a rigid support arm extending outward from the upper end of the primary member;
    said support arm having an inward end and an outward end;
    a base support;
    the primary member being connectable at its lower end to the base support;
    a cylindrical pin member having an inward end and an extended end which are aligned with each other along a longitudinal axis of the cylindrical in member, the cylindrical pin member being pivotally mounted at its inward end to the outward end of the support arm;
    the cylindrical pin member being pivotally movable between a first position extending outwardly from the support arm and a second position extending downwardly from the support arm;
    a line-containing spool rotatably mounted on the cylindrical pin member;
    a retaining means at the extended end of the cylindrical pin member;
    the cylindrical pin member held in its first position by a trigger means, said trigger means releasable upon downward force exerted upon line extending downwardly from the spool; and
    the cylindrical pin member gravitationally pivoted to its second position upon release.

2. The invention of claim 1, wherein said base support is a rectangular box having four sides, an open top, and a bottom surface, with said bottom surface further defining a proximately centered aperture.

3. The invention of claim 2, wherein the lower end of the primary member is connectable to the base support by a threaded bolt and mounted nut extending outwardly from one of the four sides of the rectangular box a resilient clip, conforming to said bolt and nut, mounted on the lower end of the primary member.

4. The invention of claim 3, wherein the rectangular box further comprises:
    a first and a second rectangular box member, each of the first and second box members of equal dimension;
    a fastening mechanism located on opposite sides of each of the first and second box members, the fastening mechanism of each box member corresponding with the other.

5. The invention of claim 4, wherein each fastening mechanism further comprises:
    a hook attachment affixed to the side of the corresponding box member and a threaded bolt extending from the opposing side of the corresponding box member;
    each hook attachment moveable to engage the extending threaded bolt of the other box member when upper edges of each box member are placed proximate each other; and
    a handle affixed to at least one of the first and second rectangular box members.

6. The invention of claim 1, wherein the trigger means further comprises a bendable resilient trigger member having a first end and second end, mounted at its first end to the primary member proximate the inward end of the support arm in a first resilient, static position with its second end extending vertically;
    said trigger member being resiliently bendable horizontally to a second tension position proximate the rotatably mounted spool;
    a rigid wire member having a lower end and an upper end, connected at its lower end to and extending upwardly to its upper end from one of: (a) the cylindrical pin member; or (b) the rotatably mounted spool;
    said rigid wire member being bent at at least a 90° angle to provide a bent portion thereof at its upper end;
    the second end of said trigger member extending beneath the bent portion of the rigid wire member when the cylindrical pin member is in its first position; and
    the pivotal movement of the cylindrical pin member from its first position toward its second position releasing the trigger member to its first position.

7. The invention of claim 6, further comprising a flag affixed to the trigger member.

8. The invention of claim 1, further comprising:
    a light bulb;
    a power source;
    an electrical circuit connecting said light bulb and power source when the cylindrical pin is in its second position.

9. The invention of claim 1, wherein the retaining means at the extended end of the cylindrical pin member comprises a threaded portion of said cylindrical pin member and corresponding nut.

10. The invention of claim 9, wherein, further, a washer member is mounted outwardly from the inward end of the cylindrical pin member and abutting the line-containing spool; and
    a means is provided to resist rotation of the spool.

11. The invention of claim 10, wherein the means to resist rotation of the line containing spool further comprises tightening the nut on the threaded portion of the cylindrical pin member.

12. The invention of claim 10, wherein the means provided to resist rotation of the spool prevents any rotation of the spool.

13. The invention of claim 12, wherein the means to prevent rotation of the line containing spool further comprises further tightening the nut on the threaded portion of the cylindrical pin member.

14. The invention of claim 1, wherein the first position of the cylindrical pin member is substantially horizontal and the second position of the cylindrical pin member is substantially vertical.

15. A tip up fishing device further comprising:
a first tip up device comprising:
a primary vertically inclined member having a lower end and an upper end;
a rigid support arm extending outward from the upper end of the primary member;
said support arm having an inward end and an outward end;
a base support comprising a box member having four vertical sides, a bottom surface defining a generally proximately centered aperture, and an open top;
the primary member being connectable at its lower end to the base support by means of inserting said lower end through said centered aperture;
a cylindrical pin member having an inward end and an extended end, the cylindrical pin member being pivotally mounted at its inward end to the outward end of the support arm;
the cylindrical pin member being pivotally moveable between a first position extending outwardly from the support arm and a second position extending downwardly from the support arm;
a line-containing spool rotatably mounted on the cylindrical pin member;
a retaining means at the extended end of the cylindrical pin member;
the cylindrical pin member held in its first position by a trigger means, said trigger means releaseable upon downward force exerted upon line extending downwardly from the spool;
the cylindrical pin member gravitationally pivoting to its second position upon release; and
the primary vertically inclined member, rigid support arms, cylindrical pin, and spool all conformed to fit between the vertical sides of the base support box member;
a second tip up device further comprising;
a primary vertically inclined member having a lower end and an upper end;
a rigid support arm extending outward from the upper end of the primary member;
said support arm having an inward end and an outward end;
a base support comprising a box member having four vertical sides, a bottom surface defining a generally proximately centered aperture and an open top;
the primary member being connectable at its lower end to the base support by means of inserting said lower end through said centered aperture;
a cylindrical pin member having an inward end and an extended end, the cylindrical pin member being pivotally mounted at its inward end to the outward end of the support arm;
the cylindrical pin member being pivotally moveable between a first position extending outwardly from the support arm and a second position extending downwardly from the support arm;
a line-containing spool rotatably mounted on the cylindrical pin member;
a retaining means at the extended end of the cylindrical pin member;
the cylindrical pin member held its first position by a trigger means, said trigger means releasable upon downward force exerted upon line extending downwardly from the spool;
the cylindrical pin member gravitationally pivoting to its second position upon release; and
the primary vertically inclined member, rigid support arm, cylindrical pin, and spool all conformed to fit between the vertical sides of the base support box member;
the base support box member of each of the first tip up device and the second tip up device being of equal dimension, each with a uniform upper edge of equal height on each of the four vertical sides;
the base support box member of each of the first tip up device and the second tip up device having a fastening mechanism located at opposite sides, the fastening mechanisms of each base support box member corresponding with the other.

16. The invention of claim 15, wherein the lower end of the primary vertically inclined member of each of the first tip up device and second tip up device is additionally connectible at its lower end to its respective box member by a threaded bolt and mounted nut extending outwardly from one side of each respective box member and a resilient clip conforming to said bolt and nut, mounted on the lower end of each primary member.

17. The invention of claim 15, wherein the trigger means of each of the first tip up device and second tip up device further comprises a bendable resilient trigger member having a first end and second end, mounted at its first end to the primary member proximate the inward end of the support arm in a first resilient, static position with its second end extending vertically;
said trigger member being resiliently bendable horizontally to a second tension position proximate the rotatably mounted spool;
a rigid wire member having a lower end and an upper end connected at its lower end to and extending upwardly to its upper end from one of: (a) the cylindrical pin member; or (b) the rotatably mounted spool;
said rigid wire member being bent at at least a 90° angle to provide a bent portion thereof at its upper end;
the second end of said trigger member extending beneath the bent portion of the rigid wire member when the cylindrical pin member is in its first position; and
the pivotal movement of the cylindrical pin member from its first position toward its second position releasing the trigger member to its first position.

18. The invention or claim 17, further comprising a flag affixed to the trigger member.

19. The invention of claim 15, further comprising
a light bulb;
a power source;
an electrical circuit connecting said light bulb and power source when the cylindrical pin of each of the first tip up device and second tip up device is in its second position.

* * * * *